United States Patent
Zampiello et al.

(10) Patent No.: US 7,656,817 B2
(45) Date of Patent: Feb. 2, 2010

(54) METHODS AND APPARATUS TO PROVISION NAME-SERVERS

(75) Inventors: Geoffrey R. Zampiello, Norwalk, CT (US); F. William Frinder, Jr., Brewster, NY (US); James Forsyth, Royal Oak, MI (US)

(73) Assignee: SBC Knowledge Ventures, L.P., Reno, NV (US)

( * ) Notice: Subject to any disclaimer, the term of this patent is extended or adjusted under 35 U.S.C. 154(b) by 525 days.

(21) Appl. No.: 11/495,133

(22) Filed: Jul. 28, 2006

(65) Prior Publication Data

US 2008/0025316 A1   Jan. 31, 2008

(51) Int. Cl.
H04L 12/26 (2006.01)
G06F 15/177 (2006.01)
G06F 15/173 (2006.01)

(52) U.S. Cl. .................... 370/252; 709/220; 709/226
(58) Field of Classification Search .................. None
See application file for complete search history.

(56) References Cited

U.S. PATENT DOCUMENTS

| | | | | |
|---|---|---|---|---|
| 5,974,453 | A * | 10/1999 | Andersen et al. | ............ 709/220 |
| 2003/0007482 | A1 | 1/2003 | Khello et al. | |
| 2003/0027569 | A1 | 2/2003 | Ejzak | |
| 2004/0003114 | A1 | 1/2004 | Adamczyk | |
| 2004/0196506 | A1 | 10/2004 | Izumi et al. | |
| 2004/0258063 | A1 | 12/2004 | Raith et al. | |
| 2005/0182781 | A1 | 8/2005 | Bouvet | |
| 2006/0020713 | A1 | 1/2006 | Kobayashi et al. | |

OTHER PUBLICATIONS

Wikipedia, "Telephone Number Mapping," Apr. 16, 2006, 2 pages.
Wikipedia, "Domain Name System," May 8, 2006, 11 pages.
Wikipedia, "Lightweight Directory Access Protocol," May 6, 2006, 9 pages.
Wikipedia, "E.164," Apr. 28, 2006, 3 pages.
Wikipedia, "Denial-of-service attack," May 7, 2006, 7 pages.
Gracion Software, "What is LDAP," Printed on May 16, 2006, 2 pages.

* cited by examiner

*Primary Examiner*—Steven H Nguyen
(74) *Attorney, Agent, or Firm*—Hanley, Flight & Zimmerman, LLC.

(57) ABSTRACT

Methods and apparatus are disclosed to provision name-servers. An example method disclosed herein includes associating a plurality of ranges of threshold numbers with respective ones of a plurality of name-servers, computing a number based on an identifier for a plurality of subscribers, locating at least one of the plurality of ranges of threshold numbers corresponding to the computed number, and assigning a plurality of name server records for the plurality of subscribers to at least one of the plurality of name-servers corresponding to the located one of the plurality of ranges of threshold numbers.

18 Claims, 6 Drawing Sheets

400

| NS (402) | THRESHOLD (404) |
|---|---|
| 1 | 0.00 - 0.10 |
| 2 | 0.11 - 0.20 |
| 3 | 0.21 - 0.30 |
| 4 | 0.31 - 0.40 |
| 5 | 0.41 - 0.50 |
| 6 | 0.51 - 0.60 |
| 7 | 0.61 - 0.70 |
| 8 | 0.71 - 0.80 |
| 9 | 0.81 - 0.90 |
| 10 | 0.91 - 1.00 |

410

| NS (412) | THRESHOLD (414) | |
|---|---|---|
| 1 (416) | 0 | |
| 2 (418) | 0 | |
| 3 | 0.00 - 0.10 | |
| 4 | 0.11 - 0.20 | 30% |
| 5 | 0.21 - 0.30 | |
| 6 | 0.31 - 0.50 | |
| 7 | 0.51 - 0.70 | 70% |
| 8 | 0.71 - 1.00 | |

FIG. 1

| | 202 NPA | 204 NXX | 206 NS |
|---|---|---|---|
| 208 → | 502 | 896 | 1 |
| 210 → | 502 | 896 | 14 |
| | 502 | 425 | 2 |
| | . | . | . |
| | . | . | . |
| | . | . | . |
| | 414 | 547 | 7 |
| | 414 | 288 | 4 |
| | 414 | 289 | 8 |
| | . | . | . |
| | . | . | . |
| | . | . | . |

| NS (402) | THRESHOLD (404) |
|---|---|
| 1 | 0.00 - 0.10 |
| 2 | 0.11. - 0.20 |
| 3 | 0.21 - 0.30 |
| 4 | 0.31 - 0.40 |
| 5 | 0.41 - 0.50 |
| 6 | 0.51 - 0.60 |
| 7 | 0.61 - 0.70 |
| 8 | 0.71 - 0.80 |
| 9 | 0.81 - 0.90 |
| 10 | 0.91 - 1.00 |

| NS (412) | THRESHOLD (414) | |
|---|---|---|
| 1 ← 416 | 0 | |
| 2 ← 418 | 0 | |
| 3 | 0.00 - 0.10 | ⎫ |
| 4 | 0.11 - 0.20 | ⎬ 30% |
| 5 | 0.21 - 0.30 | ⎭ |
| 6 | 0.31 - 0.50 | ⎫ |
| 7 | 0.51 - 0.70 | ⎬ 70% |
| 8 | 0.71 - 1.00 | ⎭ |

METHODS AND APPARATUS TO PROVISION NAME-SERVERS

FIELD OF THE DISCLOSURE

This disclosure relates generally to network routing, and, more particularly, to methods and apparatus to provision name-servers.

BACKGROUND

Network carriers (hereinafter "carrier" or "carriers") typically accommodate a growing customer base by adding hardware resources that, among other things, store customer data and facilitate customer services. The carriers, such as telecommunication companies providing voice, video, audio, and/or other data services, may associate each node and/or sub-node of the network (e.g., intranet, Internet, etc.) with a resource record. Each resource record provides information relating to a corresponding node location on the network. Nodes and/or sub-nodes include web sites, telephones, fax machines, e-mail addresses, and/or computers.

The resource records (RRs) noted above may be managed by a domain name system (DNS), which is implemented by domain name-servers distributed throughout the network. The DNS is a system that stores information associated with domain names on networks, such as the Internet, in a distributed database located, for example, in the DNS servers. The DNS enables resolution of an internet protocol (IP) address associated with a domain name and contained in a message such as an Internet Protocol (IP) message transmitted in a network such as Internet. Resource records stored by a DNS server may include human-readable hostnames for 32 and/or 128-bit IP addresses (e.g., IPv4 and IPv6, respectively), domain name aliases, mail exchange records, mail exchange server lists for a particular domain, authority records, and/or text records. Because each server of a DNS has limited storage resources, additional servers are added from time to time to accommodate network growth.

Managing network growth, such as by allocating new resource records to servers that have adequate storage capacity, includes tedious server status monitoring and design of instructions to dictate which particular records are to be stored on which particular servers. For example, a carrier providing services to 5,000 new customers must decide which servers have capacity to store the new customer data based on a numbering plan area (NPA) (e.g., an area code), and/or an exchange (e.g., a phone number prefix, hereinafter referred to as a "prefix" and/or "NXX"). If existing servers do not have an adequate capacity to accommodate the new customers, then new servers are added and all prior rules that dictate where new resource records are stored must be modified to point to the new server(s).

DETAILED DESCRIPTION

Methods and apparatus to provision name-servers are disclosed. An example method includes associating a plurality of ranges of threshold numbers with respective ones of a plurality of name-servers, computing a number based on an identifier for a plurality of subscribers, locating the range of threshold numbers corresponding to the computed number, and assigning a plurality of name server records for the plurality of subscribers to at least one of the plurality of name-servers corresponding to the located range of random numbers. An example apparatus includes a plurality of name-servers, and a provisioner to assign a set of customers associated with an identifier to at least one of the plurality of name-servers.

Figure 1:
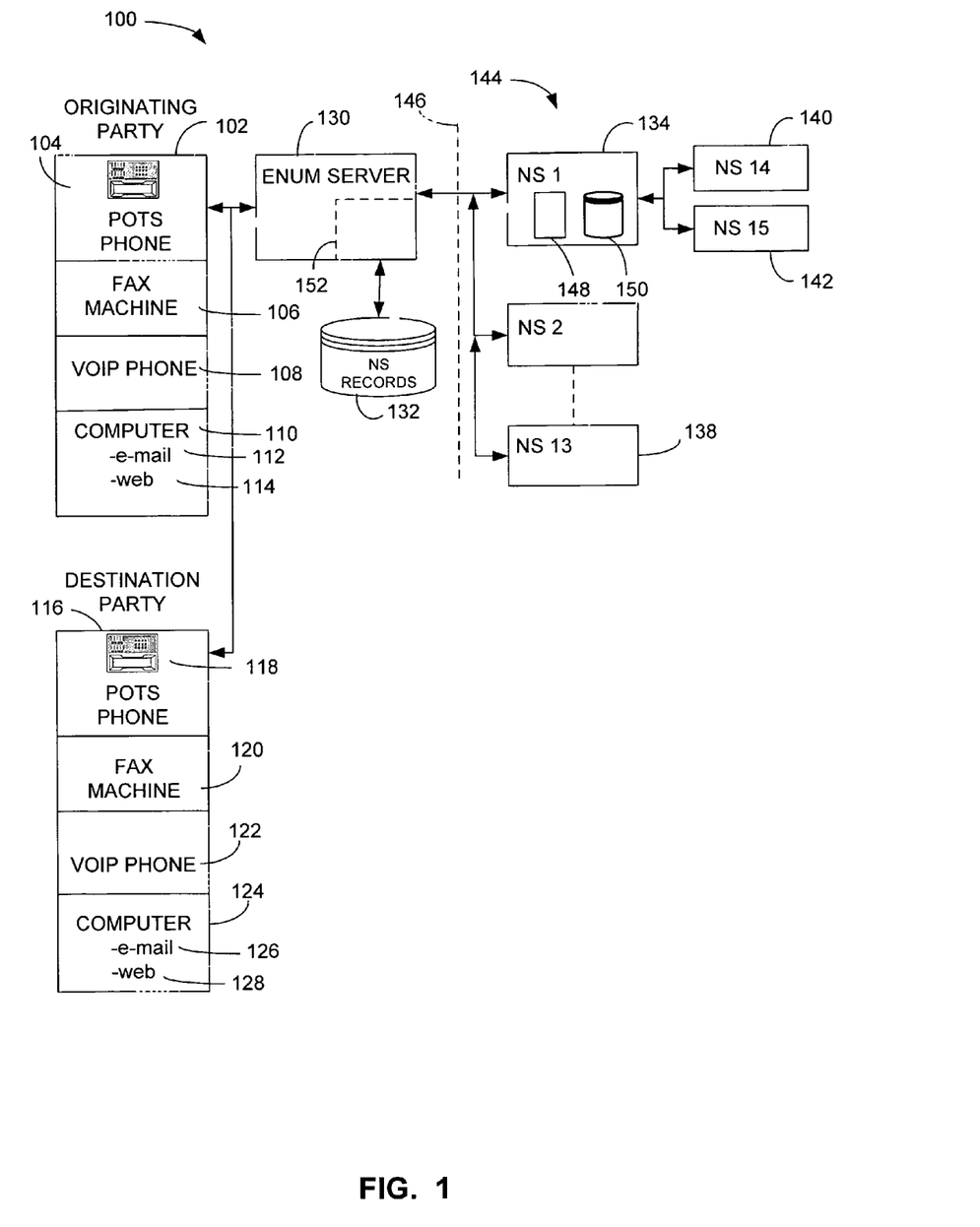
FIG. 1 is a schematic diagram illustrating an example system to provision name-servers.

An example system 100 to provision name-servers is shown in FIG. 1. The system 100 of the illustrated example updates domain name-servers (hereinafter referred to as name-servers) with resource records (RRs) based on network changes and/or growth. In the example of FIG. 1, an example originating party 102 includes a plain old telephone system (POTS) telephone 104, a fax machine 106, a voice over internet protocol (VoIP) telephone 108, and/or a computer 110. The computer 110 of the illustrated example is associated with an email address 112 and/or a web address 114, such as a web page alias. In the example of FIG. 1, an example destination party 116 includes similar network devices as the example originating party 102, such as a POTS telephone 118, a fax machine 120, a VoIP telephone 122, and/or a computer 124. The computer 124 of the destination party 116 is associated with a destination e-mail address 126 and/or a destination web-address 128, such as a specific internet protocol (IP) address associated with a web-page alias.

While a calling party (e.g., the originating party 102 originating a call to the destination party 116) may have an alias destination identifier, such as a phone number or web-page address, the alias destination identifiers are resolved to specific IP addresses before any communicative connection can occur between the originating party 102 and the destination party 116. An alias destination identifier may include a numbering plan area (NPA), which may be, for example, an area code. The alias destination identifier may, additionally or alternatively, include a central office (CO) prefix, such as a three digit number referred to as an NXX. Moreover, the alias destination identifier may include a suffix identifier, which is typically 4 digits for North American telephone numbering systems. Cumulatively, the NPA/NXX/suffix identifier may represent the alias destination identifier of an originating party, which is typically sufficient for POTS telephone calls. While such 10-digit North American telephone numbers are used for conventional POTS telephone calls, some alias destination identifiers may be associated with other devices of a network, such as VoIP telephones, cellular (wireless) telephones, pagers, and/or e-mail addresses, etc. Accordingly, the alias destination identifier entered by an originating party must be reconciled to determine an associated IP address to accommodate communicative connectivity with one or more other device(s) of the network.

While the concepts described herein may apply to any type of alias destination identifier, such as a phone number, an e-mail address, and/or a web address (e.g., www.att.com), the following examples will describe alias destination identifiers having an NPA, NXX, and/or suffix. The NPA (e.g., area code) and NXX (e.g., CO prefix) typically represent a geographic area. For example, the NPA "312" represents an area code for the city of Chicago, while the NXX of "580" represents one of many COs within that NPA. An originating party 102 in any locality may attempt to use an alias destination identifier when placing a call to the destination party 116. In the illustrated example, the NPA (and/or NPA plus NXX plus any suffix) is received by an E164 Number Mapping (ENUM) server 130 to aid customers with enhancing widespread portability of telephone numbers. The ENUM server 130 of the illustrated example maps telephone numbers to IP addresses. More specifically, the ENUM server 130 employs a DNS-based method for mapping telephone numbers to uniform resource locators (URLs) and/or IP addresses. For instance, in an example DNS method, any number can be transformed into a hostname by reversing the numbers, separating them with dots (i.e., periods), and adding a suffix, such as "e164.arpa."

Upon receiving a phone number and/or NPA/NXX combination, the ENUM server 130 of the illustrated example queries an ENUM database 132, which contains name-server (NS) records. Specific NS records exist for every established NPA/NXX variation. As used herein, an NPA, NPA combined with an NXX, and/or NPA/NXX/suffix combination will also be referred to as an "identifier." These NS records point to one or more DNS servers (also referred to as name-servers (NSs)). The particular NS pointed to by a given NS record allows specific resource records (RRs) associated with the NPA/NXX variation to be retrieved (an NPA, NPA combined with an NXX, and/or NPA/NXX/suffix combination will also be referred to as an "identifier"). Accordingly, if the ENUM server 130 queries the ENUM database 132 regarding a particular identifier and receives a response of "NS 1," then RRs for that identifier are found in NS 1 (134). The example system 100 of FIG. 1 includes NS 1 (134), NS 2 (136), NS 13 (138), NS 14 (140), and NS 15 (142), but persons of ordinary skill in the art will appreciate that any number of NSs may be employed in view of any particular needs of the carrier. Each of the NSs 134-142 that the carrier employs may reside within a private network 144, illustrated to the right hand side of the dotted line 146 in FIG. 1. As a result, the NSs 134-142, RRs stored therein, and/or any other data are protected from attacks from a public network, such as denial of service (DoS) attacks from the Internet.

In the illustrated example, each of the NS's includes a lightweight directory access protocol (LDAP) server 148 and an LDAP database 150 to store raw DNS records (also referred to herein as RRs). While the LDAP server 148 and LDAP database 150 are only shown in NS 1 of FIG. 1, in the example of FIG. 1 all of the NSs 134-142 include similar components.

The LDAP server 148 of the illustrated example employs a standard that defines a manner of organizing directory hierarchies and an interface for clients to access the directory servers. A client of the LDAP server 148 (e.g., the ENUM server 130) may send operation requests to the LDAP server 148. The LDAP server 148 of the illustrated example will send corresponding responses back to the client based on data contained within the LDAP database 150. Requests to the LDAP server 148 may include, but are not limited to, bind requests, transport layer security (TLS) initiation requests, searches, compares, adds, deletes, modifications, and/or unbind requests to close a connection. For example, the ENUM server 130 of the illustrated example may route a message to NS 1 (134) based on information returned from the ENUM database 132 in response to a query regarding an identifier of "312580." More specifically, the ENUM server 130 of the illustrated example may append more detailed information, such as a subscriber number "1234" to the identifier (e.g., "312580") and request that IP addresses associated with the identifier, if any, be returned. If such information is available in the addressed NS, it will be returned to the ENUM server 130 to allow the originating party 102 to complete their communication using the newly discovered IP address of the destination party.

In the illustrated example, additional NSs may be added to existing NSs in a horizontal manner to accommodate for network/subscriber growth. Therefore, if such information is not available in the additional NS (e.g., NS 1), then the NS 1 (134) may query a child NS, such as NS 14 (140) and/or NS 15 (142) to obtain the destination address. In other words, when requested information is not found in a parent NS, such as NS 1 (134), then the parent automatically routes the LDAP server request to one or more subsequent NSs to request resource record information for the particular identifier. If no such information is available, even after a query down all NSs of the family, then the parent NS communicates the lack of such information to the ENUM server 130, which in turn, informs the originating party 102 that their call should be completed via, for example, the POTS system rather than via the DNS-based system (e.g., the Internet). On the other hand, if any NS contains specific information associated with the particular identifier, then that information is returned to the originating party 102 so that their communication may be completed to the specific IP address of the destination party 116.

As discussed in further detail below, the ENUM server 130 of the illustrated example includes a provisioner 152 to associate new identifiers with NSs of the carrier's private network 144. The provisioner 152 of the illustrated example builds the NS records of the ENUM database 132.

Figure 2:
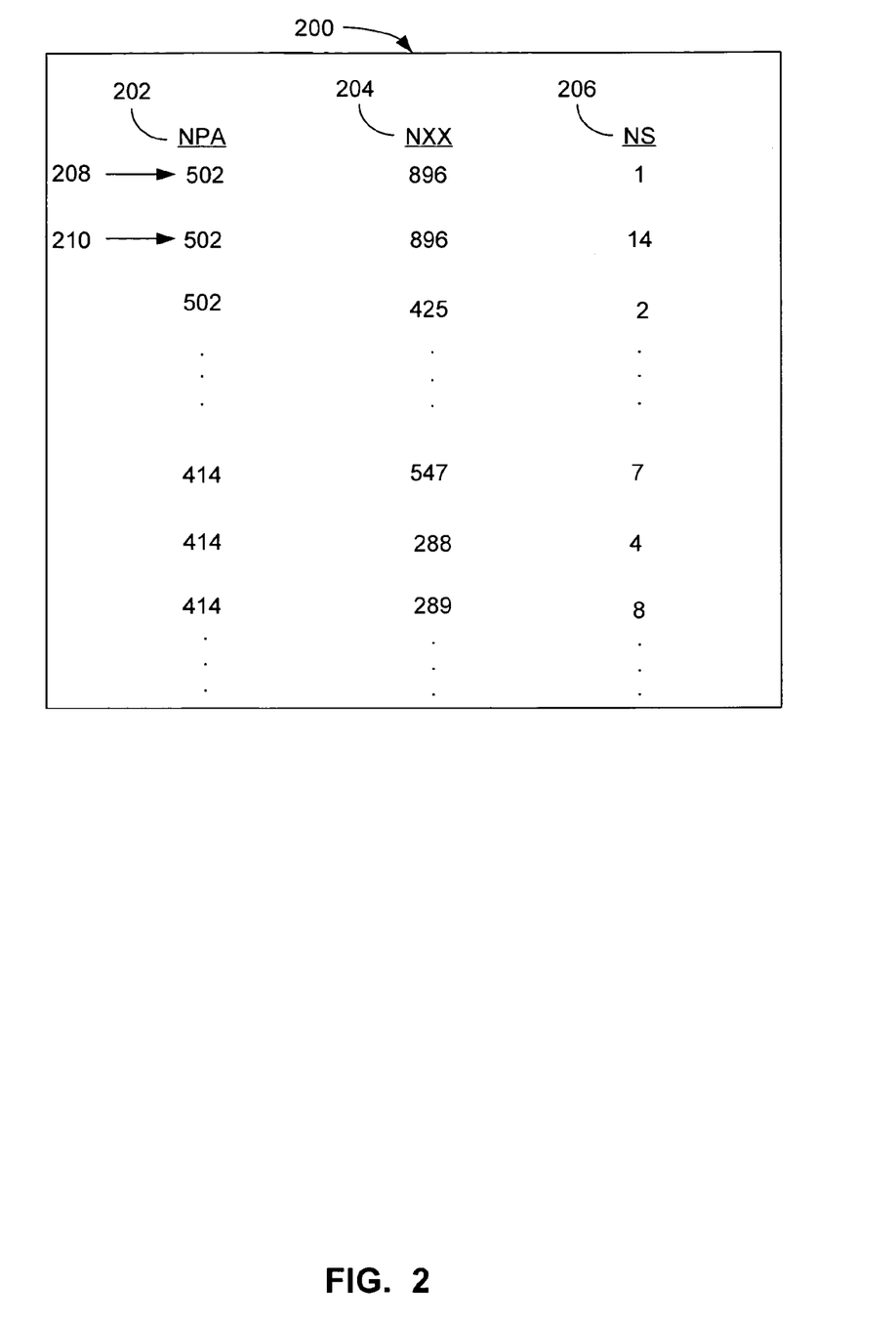
FIG. 2 is an example portion of a database table of the example system of FIG. 1.

An example NS record 200 is shown in FIG. 2. In the example of FIG. 2, a first column 202 lists various NPAs, (e.g., area codes) for which the carrier may provide services for their subscribers. A second column 204 lists various NXXs that are associated with the NPA listed within the corresponding row of the example NS record 200. A central office in North America typically follows particular digit assignment rules for the NXX representation. For example, "N" is typically any number between 2 and 9, but "XX" is typically any number between 0 and 9. A third column 206 of the example NS record 200 shown in FIG. 2 lists an NS associated with the identifier of the corresponding row of the example NS record 200. A query to the ENUM database 132 containing the NS record 200 will return an NS value corresponding to a matched identifier, thereby allowing further inquiry to that particular NS for specific RR information. As a result, the RR information obtained, such as a specific IP address associated with a destination party's device (e.g., VoIP telephone), allows the originating party 102 to complete its communication to the destination party 116.

Because some NPA/NXX combinations will service a particularly dense population, in the illustrated example multiple NSs may exist for some identical identifiers. For example, row 1 (208) and row 2 (210) each have the same NPA/NXX combination, but such combinations are represented by NS 1 and NS 14. As discussed above, if an ENUM server 130 query to an LDAP server, such as the LDAP server 148 of NS 1 (134), does not contain a match for the NPA/NXX/suffix combination, the LDAP server 148 may automatically forward the query to a subsequent NS in a chain of NSs, if any associated with the NS 1. However, if the LDAP server does not automatically provide the service of looking for the combination in any child NSs, and/or if none of the NS in the chain contain the match, then the LDAP server 148 may return a failure notification to the ENUM server 130. Because the ENUM server database 132 contains an NS record 200 showing an alternative NS for the identifier (e.g., "502896"), the ENUM server 130 makes a subsequent query to NS 14 (140) to search for the specific NPA/NXX/suffix combination, rather than immediately returning a "failed" signal to the originating party.

Figure 3:
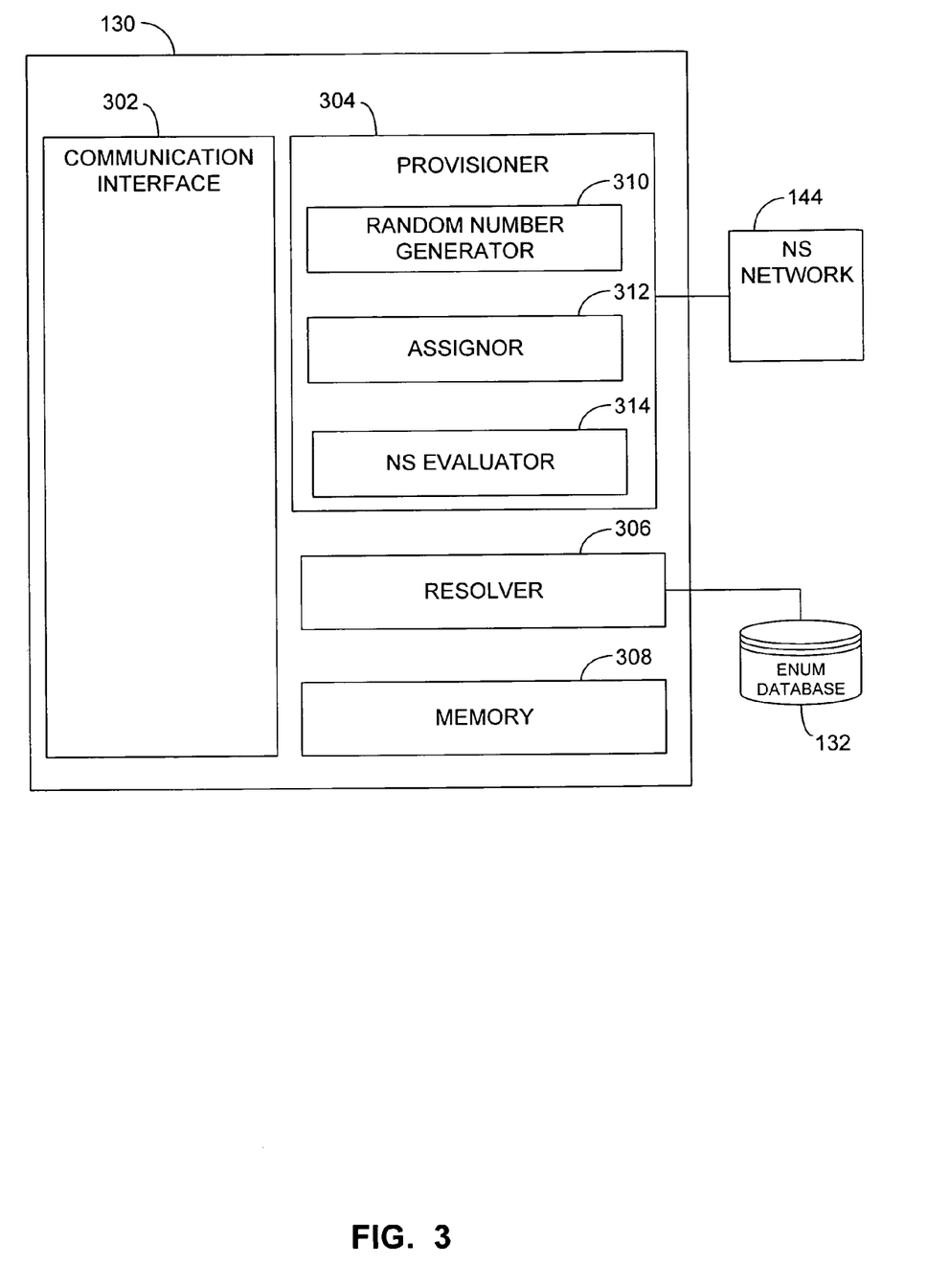
FIG. 3 is an example ENUM server of the example system of FIG. 1.

An example ENUM server 130 is shown in FIG. 3. In the illustrated example, the ENUM server 130 includes a communication interface 302, a provisioner 304, a resolver 306, and a memory 308 to store various provisioning profiles, as discussed in further detail below. The example provisioner 304 includes a random number generator 310, an assignor 312, and an NS evaluator 314 to determine remaining storage capacities of the NSs of the carrier private network 144. As discussed above, the carrier may have numerous NSs to accommodate their customers/subscribers. Any particular NS, which may include a databases and server, is not limited to operation in a geographic location of the area code and/or prefix (e.g., NPA/NXX) for which it serves. For example, an NS that accommodates the NPA/NXX combination "502896," which corresponds to Louisville, Ky., may reside anywhere in the country. Similarly, other NSs may reside in various other parts of the country as part of the carrier's private network 144.

The communication interface 302 enables communication via a network, such as an intranet or the Internet. Communication from/to the example ENUM server 130 may occur via web-pages (e.g., Active Server Pages), command-line user interfaces, graphical user interfaces, and/or kiosks. Persons of ordinary skill in the art will appreciate that the communication interface 302 may include various protective measures (e.g., a firewall) to shield the NSs from outside attack, such as a DoS attack. Accordingly, in the illustrated example, the private network and any data contained on the NSs therein are not accessible to unauthorized persons or publicly accessible via the Internet.

As discussed above, the resolver 306 receives a request, such as identifiers, from the originating party 102. In response, the resolver 306 queries the ENUM database 132 for guidance on where RRs for the received identifier may be found. One or more NS identifiers returned from the ENUM database 132 query allow the resolver to access the appropriate NS of the carrier's NS network/private network 144. The additional information retrieved from the NS facilitates the communication attempt by the originating party 102. For instance, the retrieved information may contain a specific IP address that permits communication with the destination party 116.

The example provisioner 304 determines where RRs of new identifiers are stored. For example, a carrier's private network 144 may include many NSs, with each NS having a particular capacity to store new RR information. The NS evaluator 314 queries each of the NSs in the NS network 144 for remaining storage capacity. Such capacity queries may be performed automatically on a periodic basis (e.g., once per day, once ever other day, once per week, etc.). The capacity information is stored in the memory 308. As new subscribers are added to a particular NPA/NXX combination, the storage capacity of the assigned NS decreases accordingly. Geographic locations having a larger population density and/or a relatively high rate of population growth may require additional child NSs to accommodate the new subscribers, such as the example NS 14 (140) and NS 15 (142) that accommodate subscriber needs for the NPA/NXX combination serviced by NS 1 (134).

When a new identifier is to be assigned to an NS, the ENUM server 130 receives the combination, such as a new NPA/NXX combination generated to accommodate a rapidly growing city, and passes it to the assignor 312. The assignor 312 applies one or more formulas and/or weights to the received identifier to generate a resulting value. The assignor 312 may also employ the random number generator 310 with the aforementioned formulas and/or weights to generate the resulting value. Various formulas and weights may be represented by one or more profiles that address capacity constraints of the existing NSs. One approach to compute a random or pseudo-random number includes converting the identifier to a string of ASCII characters. The string of characters may be summed and divided by a constant. While some carriers will find the aforementioned number generation sufficient to produce unique, random, and/or pseudo random output, larger carriers may be concerned with obtaining the same results by using a static constant, and/or any other deterministic computation. For example, an identifier "312580" represents a Chicago area code with a "580" prefix. The ASCII sum for this identifier is 307. However, an example identifier "313480" represents a Detroit area code with a "480" prefix, also having the same ASCII sum of 307. To minimize the possibility of generating duplicative outputs, a random number generator may be employed. Many computers and/or programming languages include functions that generate random and/or pseudo-random numbers. Typically, such output is a floating point number distributed between 0 and 1. The computers and/or programming languages that implement the random number generator may also utilize a real-time clock, a mouse input, and/or a keyboard input as a non-deterministic technique to generate the random number. In another example, the constant may be generated by the random number generator before every computation of a new identifier.

New identifiers may be assigned to existing NSs in a balanced manner such that the NS loads are substantially equally distributed. For example, some existing NSs may be filled to 90% capacity, which may be expected for NSs that have been in service for a relatively long period of time, or for NSs that represent an identifier experiencing a high rate of population growth. Other existing NSs may only be filled to 10% capacity, which may, for example, reflect the fact that the NS was added to the private network 144 recently. Still further, some carriers may have several NSs within their private network 144 that all have approximately the same remaining capacity (for example, all NSs are approximately 60% full). The carrier may prefer that this relatively even distribution of NS capacity remain balanced so that, for example, no NSs become disproportionately burdened and/or underutilized.

The assignor 312 may receive an identifier, such as, for example, "312580," and apply a simple addition operation of the individual digits to yield 19. Applying the output (e.g., "19") to the random number generator 310 may function as a seed to produce a random value between zero and one. The assignor 312 may compare the output of the random number generated to a profile stored in the memory 308, such as the example profile 400 of FIG. 4A. The example profile 400 may be configured to accommodate NS provisioning for a private network 144 of NSs that are already relatively balanced, wherein the profile seeks to maintain such balance. The example profile 400 of FIG. 4A includes an NS column 402 having a row for each NS of the carrier's private network 144, and a threshold column 404 having an entry for each corresponding NS. Ten NSs are shown in the NS column 402 of FIG. 4A, each having a corresponding threshold of approximately 10%. Any resulting value calculated by the assignor 312, based on the identifier, any formula-based manipulation of the representation, and/or any application of the random number generator 310 may be applied to a profile to assign new identifiers to an NS. For example, if the resulting value from the assignor 312 is 0.27, the assignor 312 will associate the received NPA/NXX combination with NS 3. Additionally, the assignor 312 will update the ENUM database 132 with this new assignment information so that the resolver 306 can consult the ENUM database 132 when searching for originating party 102 queries. As a result, any subsequent originating party 102 query for a suffix associated with "312580" will cause the ENUM server 130 to search NS 3 for RR information.

Profiles may be designed pursuant to any particular needs and/or constraints of a carrier network. Such profiles may be stored in the memory 308 for later use to accommodate network design and growth objectives of the carrier. For instance, the example profile 410 of FIG. 4B illustrates a network design objective that considers NSs having little or no capacity for further growth. Much like the profile of FIG. 4A, the profile of FIG. 4B includes an NS column 412 and a threshold column 414. Row 1 (416) and row 2 (418) represent NSs that still operate on the carrier's private network 144, but have no further room for growth, and thus, cannot add new identifiers. On the other hand, three of the NSs of the example profile 410 (i.e., NS 3 through NS 5) are configured to accommodate 30% of any new NPA/NXX combinations, whereas NS 6 through NS 8 are configured to accommodate the remaining 70% of any new NPA/NXX combinations. Such segmented profile configurations may be indicative of a carrier that has been growing over time while investing in new NS hardware resources when needed. For example, NS 1 and NS 2 may be filled to capacity because they were the very first two NSs employed by the carrier, while NS 3 through NS 5 may have been brought on-line at a later date, thereby still having some capacity. Furthermore, NS 6 through NS 8 each accommodate approximately 20-30% of the total because they came on-line most recently and have a relatively significant amount of remaining storage capacity.

The example profile 410 of FIG. 4B may be referred to as a correcting profile, which addresses a presently unbalanced plurality of NSs. However, execution of the correcting profile 410 may eventually result in an overall balance, wherein the remaining NS capacities accepting new NPA/NXX combinations converge to a similar level. For example, NS 3 through NS 5 may have started out with 50% remaining capacity, while NS 6 through NS 8 may have started out with 80% remaining capacity when the correcting profile 410 was invoked. Because the capacity levels of NS 6 through NS 8 decrease at a faster rate (due to a wider threshold level, thus greater probability of receiving new identifiers) than NS 3 through NS 5 due to the disproportionate weighting, a capacity convergence between NS 3 through NS 8 may occur. As a result, the carrier may eventually invoke the profile 400 of FIG. 4A, which may be referred to as a maintaining profile. Such a maintaining profile may be particularly useful when the NSs of the carrier private network 144 have a relatively similar remaining capacity. However, if the carrier adds new NSs in anticipation of significant growth, the carrier may revert back to an alternate profile, such as the correcting profile, to bring the new NSs closer to a capacity level of the older NSs.

Figure 4A:
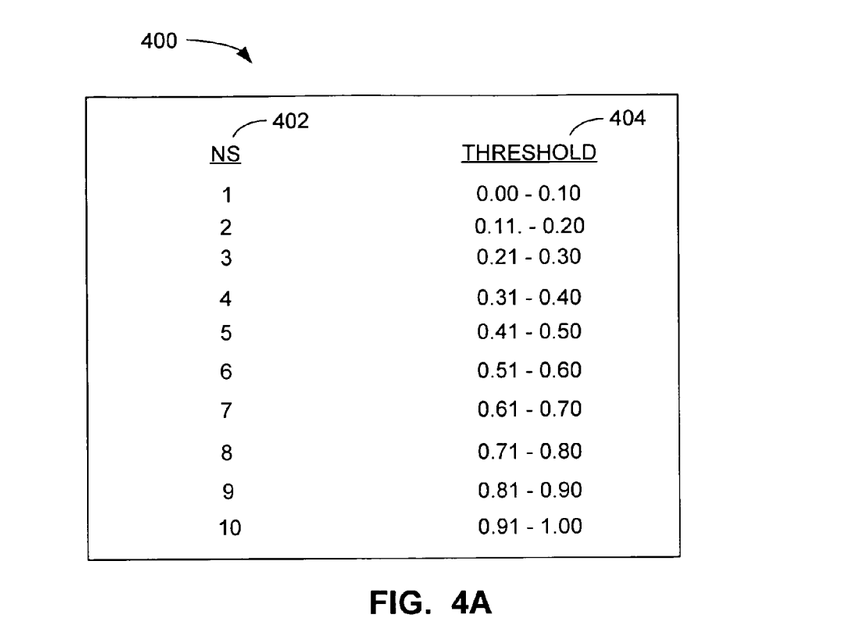
FIGS. 4A and 4B are example profiles which may be invoked by the example ENUM servers of FIGS. 1 and 3.
Figure 4B:
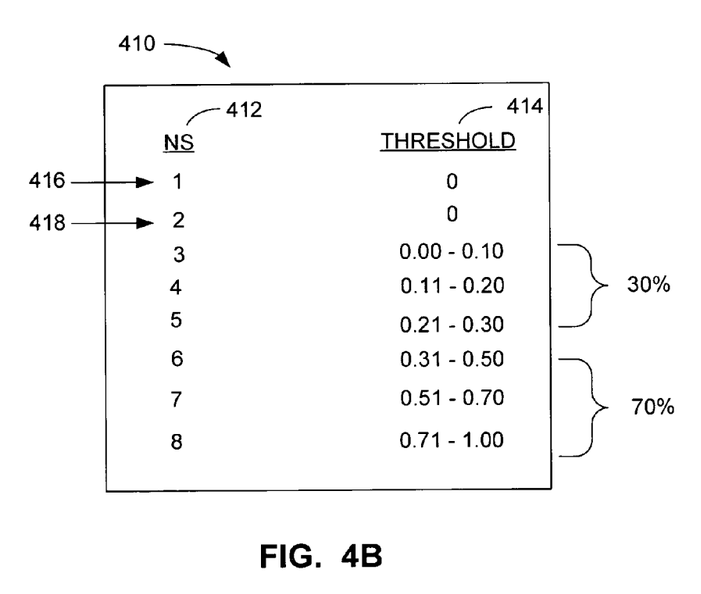

While the example threshold values of FIGS. 4A and 4B are constrained between values of zero and one, persons of ordinary skill in the art will appreciate that any threshold values may be employed for the profiles. Threshold values may be established in various zones according to the type(s) of formulas used to calculate a resulting value from the seed NPA/NXX value.

Figure 5:
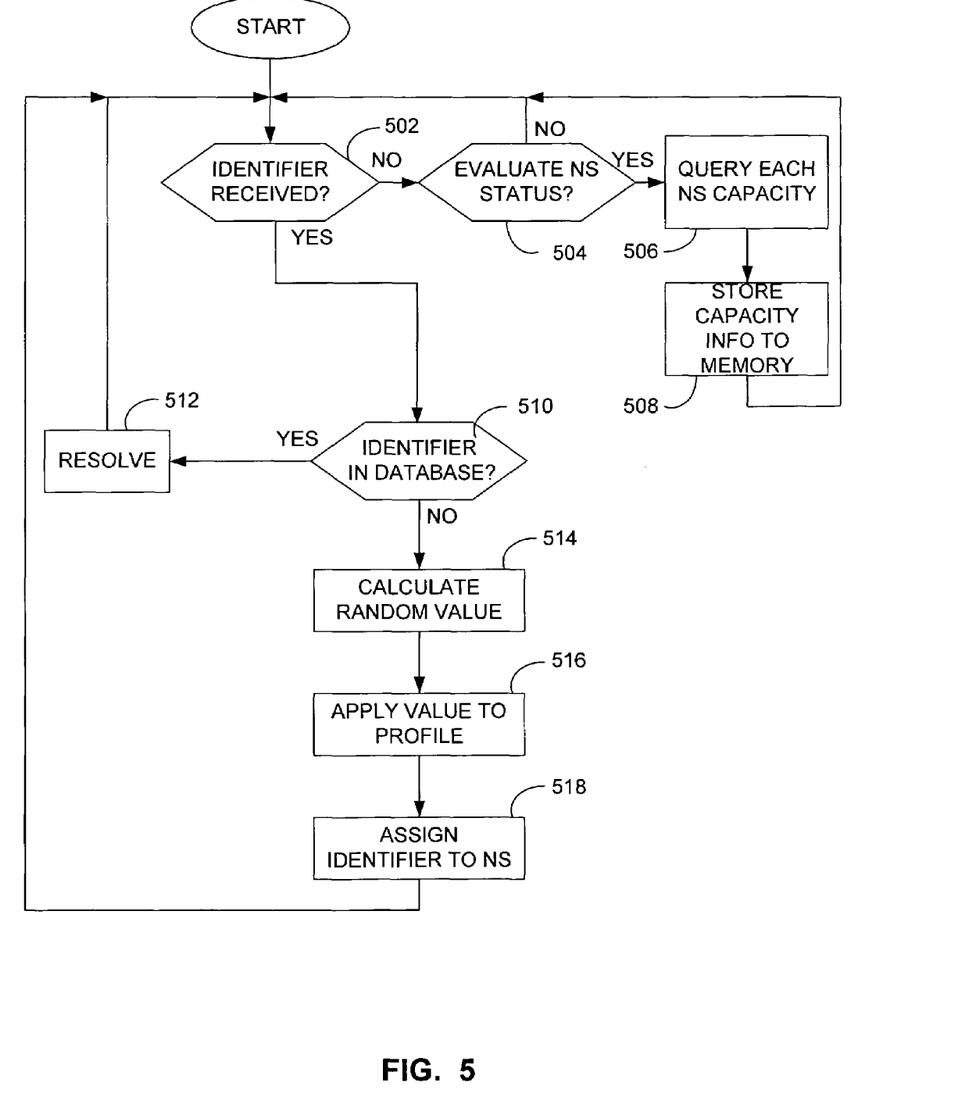
FIG. 5 is a flow diagram representative of example machine readable instructions which may be executed to implement the example system of FIG. 1.

A flowchart representative of example machine readable instructions for implementing an example NS provisioning 500 is shown in FIG. 5. In this example, the machine readable instructions comprise a program for execution by: (a) a processor such as the processor 610 shown in FIG. 6, which may be part of a computer, (b) a controller, and/or (c) any other suitable processing device. The program may be embodied in software stored on a tangible medium such as, for example, a flash memory, a CD-ROM, a floppy disk, a hard drive, a digital versatile disk (DVD), or a memory associated with the processor 610, but persons of ordinary skill in the art will readily appreciate that the entire program and/or parts thereof could alternatively be executed by a device other than the processor 610 and/or embodied in firmware or dedicated hardware in a well known manner. For example, any or all of the example system to provision name servers 100, the ENUM server 130, the provisioner 304, and/or the resolver 306 could be implemented by software, hardware, and/or firmware (e.g., it may be implemented by an application specific integrated circuit (ASIC), a programmable logic device (PLD), a field programmable logic device (FPLD), discrete logic, etc.). Further, although the example program is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The process 500 of FIG. 5 begins at block 502 where the ENUM server 130 waits for an NPA/NXX value. If no value is received, the ENUM server 130 takes advantage of processing downtime by determining if a status of the NSs in the private network 144 should be checked (block 504). As discussed above, the provisioner 304 of the ENUM server 130 may periodically invoke a status check operation to determine capacities of the various NSs of the private network 144 (block 506) and save such results to the memory 308 (block 508).

When an NPA/NXX value (identifier) is received by the ENUM server 130 (block 502), the resolver 306 determines whether the identifier already exists in the ENUM database 132 (block 510). Identifiers already found in the ENUM database 132 indicate that there exists an associated NS in the private network 144 that contains one or more RRs related to the received identifier, which may be, for example, an NPA/NXX combination and/or an NPA/NXX/suffix combination. As such, the resolver 306 resolves the identifier and returns the RR information to the requesting party (e.g., the originating party 102) (block 512), as described above. However, if the identifier is not found in the ENUM database 132, then the identifier is associated with an NS of the private network 144. Persons of ordinary skill in the art will appreciate that new identifiers received by the ENUM server 130 may be sent by an authorized carrier system administrator having appropriate access privileges to the ENUM server 130. As such, the new identifier data may be accompanied by authentication and/or security techniques, including, but not limited to, secure sockets layer (SSL), digital certificates, password protection, encryption, and/or public key cryptography.

Upon receipt of the identifier (block 502), determining that the value is not in the ENUM database 132, and determining that the identifier is accompanied by appropriate authentication parameters thereby indicating that the value requires provisioning to an NS (block 510), the assignor 312 calculates a value based on the received identifier (block 514). As described above, the assignor may use any type of mathematical approach to create a resulting random and/or pseudo-random representation. The assignor may, without limitation, simply convert the identifier to ASCII, sum the identifier, multiply and/or divide by various constants, and/or employ the random number generator 310. The calculated assignor output value is applied to a profile (block 516) to determine a particular NS with which the identifier should be associated. As described above, a system administrator may design various profiles, such as the example profiles of FIGS. 4A and 4B, to accommodate any private network 144 architecture rules and growth plans. A calculated assignor output value that falls within profile threshold boundaries indicates the particular NS to which the identifier will be assigned (block 518). After the identifier is assigned (block 518), control returns to block 502, wherein the ENUM server 130 waits for receipt of another identifier.

Figure 6:
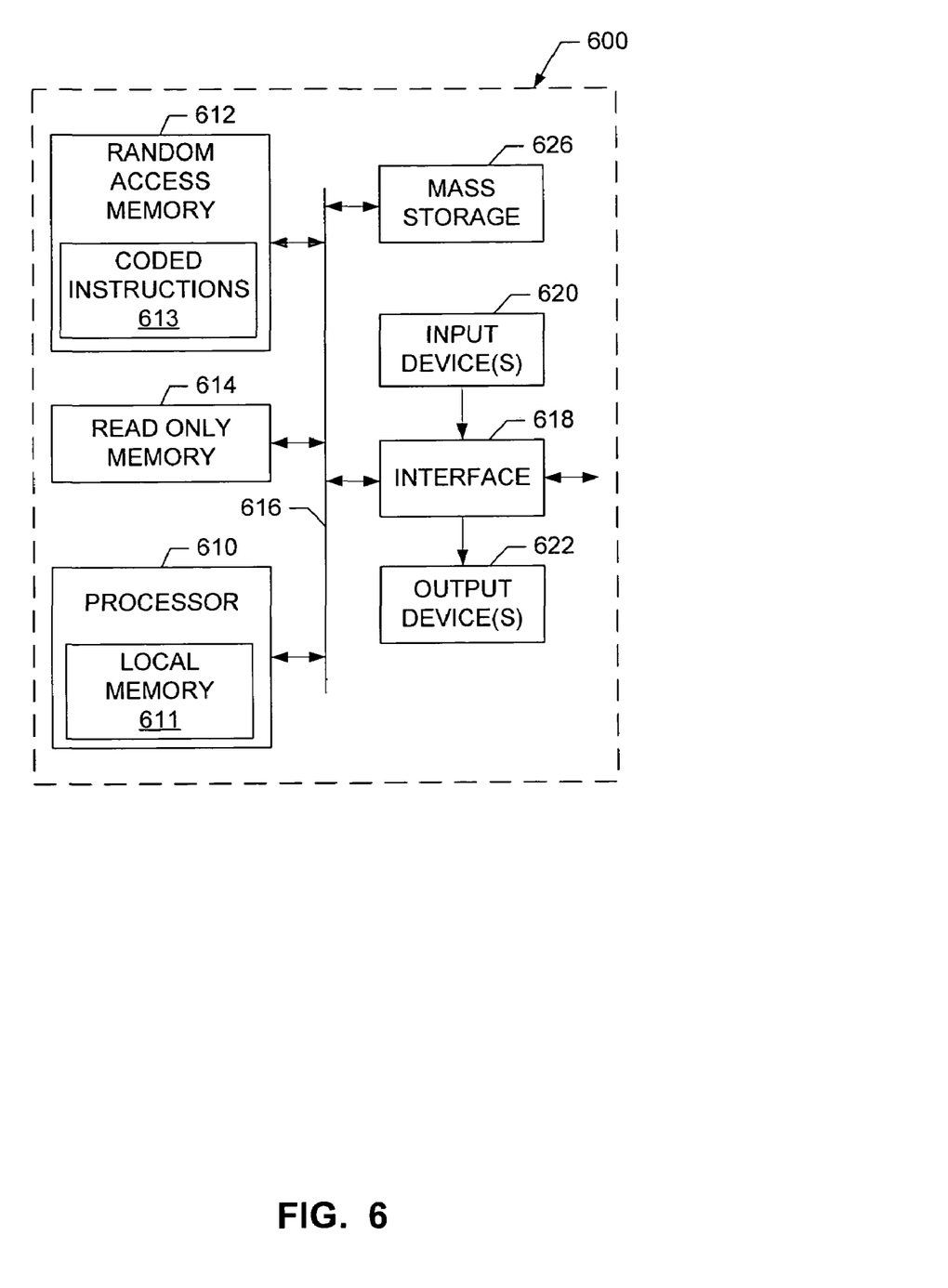
FIG. 6 is a schematic illustration of an example computer which may execute the program of FIG. 5 to implement the example system of FIG. 1.

FIG. 6 is a block diagram of an example computer 600 capable of implementing the apparatus and methods disclosed herein. The computer 600 can be, for example, a server, a personal computer, a laptop, a PDA, or any other type of computing device.

The computer 600 of the instant example includes a processor 610 such as a general purpose programmable processor. The processor 610 includes a local memory 611, and executes coded instructions 613 present in the local memory 611 and/or in another memory device. The processor 610 may execute, among other things, the example process illustrated in FIG. 5. The processor 610 may be any type of processing unit, such as a microprocessor from the Intel® Centrino® family of microprocessors, the Intel® Pentium® family of microprocessors, the Intel® Itanium® family of microprocessors, the Intel XScale® family of processors, and/or the Motorola® family of processors. Of course, other processors from other families are also appropriate.

The processor 610 is in communication with a main memory including a volatile memory 612 and a non-volatile memory 614 via a bus 616. The volatile memory 612 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 614 may be implemented by flash memory and/or any other desired type of memory device. Access to the main memory 612, 614 is typically controlled by a memory controller (not shown) in a conventional manner.

The computer 600 also includes a conventional interface circuit 618. The interface circuit 618 may be implemented by any type of well known interface standard, such as an Ethernet interface, a universal serial bus (USB), and/or a third generation input/output (3GIO) interface.

One or more input devices 620 are connected to the interface circuit 618. The input device(s) 620 permit a user to enter data and commands into the processor 610. The input device(s) can be implemented by, for example, a keyboard, a mouse, a touchscreen, a track-pad, a trackball, isopoint and/or a voice recognition system.

One or more output devices 622 are also connected to the interface circuit 618. The output devices 622 can be implemented, for example, by display devices (e.g., a liquid crystal display, a cathode ray tube display (CRT), a printer and/or speakers). The interface circuit 618, thus, typically includes a graphics driver card.

The interface circuit 618 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 600 also includes one or more mass storage devices 626 for storing software and data. Examples of such mass storage devices 626 include floppy disk drives, hard drive disks, compact disk drives and digital versatile disk (DVD) drives. The mass storage device 626 may implement the ENUM database 132, and/or any of the databases within the NSs.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplates examples wherein a device is associated with one or more machine readable mediums containing instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to provision a plurality of name-servers comprising:
    associating, by a processor, a plurality of ranges of threshold numbers with respective ones of the plurality of name-servers based on a name-server load correcting profile, the load correcting profile reflecting available capacities for the plurality of name-servers;
    computing a profile assignment value based on an identifier associated with a plurality of subscribers;
    locating at least one of the plurality of ranges of threshold numbers corresponding to the computed profile assignment value;
    assigning a plurality of name server records for the plurality of subscribers to at least one of the plurality of name-servers corresponding to the located one of the plurality of ranges of threshold numbers of the name-server load correcting profile; and
    generating an output including an identifier associated with at least one of the plurality of name-servers.

2. A method as defined in claim 1, wherein the identifier is at least one of a numbering plan area (NPA) number, a combination of an NPA number and a prefix number, or a combination of an NPA number, a prefix number, and a suffix number.

3. A method as defined in claim 1, wherein computing the profile assignment value based on the identifier comprises:
    representing the identifier as a string of ASCII characters;
    summing the string of ASCII characters; and
    dividing the sum of the string of ASCII characters by a constant.

4. A method as defined in claim 3, wherein the constant is generated by a random number or a pseudo random number generator.

5. A method as defined in claim 1, wherein the name-server load correcting profile assigns the plurality of name-server records to the plurality of name-servers in a substantially equally distributed manner.

6. A method as defined in claim 1, wherein the name-server load correcting profile comprises assigning a second plurality of name-servers a greater percentage of name-server records than a first plurality of name-servers.

7. A method as defined in claim 1, further comprising routing an identifier query to at least one of the plurality of name-servers.

8. A method as defined in claim 7, wherein the at least one of the plurality of name-servers forwards the identifier query to a child name-server when the at least one of the plurality of name-servers contains no match for the identifier query.

9. A method as defined in claim 7, wherein the at least one of the plurality of name servers returns an error message when the at least one of the plurality of name-servers contains no match for the identifier query.

10. An article of manufacture storing machine readable instructions to provision a plurality of name-servers which, when executed, by a processor, cause a machine to:
    associate a plurality of ranges of threshold numbers with respective ones of the plurality of name-servers based on a name-server load correcting profile, the load correcting profile reflecting available capacities for the plurality of name-servers;
    compute a profile assignment value based on an identifier associated with a plurality of subscribers;
    locate at least one of the plurality of ranges of threshold numbers corresponding to the computed profile assignment value; and
    assign a plurality of name server records for the plurality of subscribers to at least one of the plurality of name-servers corresponding to the located one of the plurality of ranges of threshold numbers of the name-server load correcting profile.

11. An article of manufacture as defined in claim 10, wherein the machine readable instructions further cause the machine to identify at least one of a numbering plan area (NPA) number, a combination of an NPA number and a prefix number, or a combination of an NPA number, a prefix number, and a suffix number.

12. An article of manufacture as defined in claim 10, wherein the machine readable instructions further cause the machine to compute the profile assignment value by:
    representing the identifier as a string of ASCII characters;
    summing the string of ASCII characters; and
    dividing the sum of the string of ASCII characters by a constant.

13. An article of manufacture as defined in claim 12, wherein the machine readable instructions further cause the machine to generate the constant with a random number or a pseudo random generator.

14. An article of manufacture as defined in claim 10, wherein the name-server load correcting profile further causes the machine to assign the plurality of name-server records to the plurality of name-servers in a substantially equally distributed manner.

15. An article of manufacture as defined in claim 10, wherein the name-server load correcting profile further causes the machine to assign a first plurality of name-servers a lesser percentage of name-server records than a second plurality of name-servers.

16. An article of manufacture as defined in claim 10, wherein the machine readable instructions further cause the machine to route an identifier query to at least one of the plurality of name-servers.

17. An article of manufacture as defined in claim 16, wherein the machine readable instructions further cause the at least one of the plurality of name-servers to forward the identifier query to a child name-server when the at least one of the plurality of name-servers contains no match for the identifier query.

18. An article of manufacture as defined in claim 16, wherein the machine readable instructions further cause the at least one of the plurality of name-servers to return an error message when the at least one of the plurality of name-servers contains no match for the identifier query.

* * * * *

UNITED STATES PATENT AND TRADEMARK OFFICE
CERTIFICATE OF CORRECTION

PATENT NO. : 7,656,817 B2 Page 1 of 1
APPLICATION NO. : 11/495133
DATED : February 2, 2010
INVENTOR(S) : Zampiello et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twenty-eighth Day of December, 2010

David J. Kappos
*Director of the United States Patent and Trademark Office*